(12) United States Patent
Inano

(10) Patent No.: US 12,445,016 B2
(45) Date of Patent: Oct. 14, 2025

(54) ELECTRIC MOTOR COOLING APPARATUS

(71) Applicant: TOYOTA JIDOSHA KABUSHIKI KAISHA, Toyota (JP)

(72) Inventor: Hiroshi Inano, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 310 days.

(21) Appl. No.: 18/183,526

(22) Filed: Mar. 14, 2023

(65) Prior Publication Data
US 2023/0307994 A1 Sep. 28, 2023

(30) Foreign Application Priority Data
Mar. 22, 2022 (JP) .................. 2022-046094

(51) Int. Cl.
*H02K 9/19* (2006.01)
*B60K 1/00* (2006.01)

(52) U.S. Cl.
CPC .................. *H02K 9/19* (2013.01); *B60K 1/00* (2013.01); *B60K 2001/006* (2013.01)

(58) Field of Classification Search
CPC .... B60K 1/00; B60K 2001/006; H02K 7/116; H02K 9/19
USPC .......................................................... 310/54
See application file for complete search history.

(56) References Cited

U.S. PATENT DOCUMENTS

| | | | | |
|---|---|---|---|---|
| 7,859,143 B2 * | 12/2010 | Jajtic | ...................... | H02K 41/02 310/12.29 |
| 8,708,071 B2 * | 4/2014 | Yokoyama | .............. | B60L 50/51 180/65.265 |
| 10,746,287 B2 * | 8/2020 | Miyamoto | .............. | F25B 45/00 |
| 2010/0219702 A1 * | 9/2010 | Jajtic | ...................... | H02K 41/02 310/60 A |
| 2014/0191696 A1 * | 7/2014 | Hattori | .................... | H02P 31/00 318/473 |

(Continued)

FOREIGN PATENT DOCUMENTS

| JP | 2007-209160 A | 8/2007 |
|---|---|---|
| JP | 2015195648 A * | 11/2015 |

(Continued)

OTHER PUBLICATIONS

Translation of foreign document JP 2021118605 A (Year: 2021).*

*Primary Examiner* — Alex W Mok
(74) *Attorney, Agent, or Firm* — Sughrue Mion, PLLC

(57) ABSTRACT

An electric motor cooling apparatus applied to an electric motor mounted as a driving force source on a vehicle. The electric motor has a stator core and a stator coil wound around the stator core, the electric motor cooling apparatus ejects coolant toward the stator coil. The electric motor cooling apparatus comprises a cooling pipe disposed above the electric motor in direction of a vertical line in on-vehicle state. The cooling pipe has an ejection aperture from which the coolant is ejected. The electric motor cooling apparatus comprises an acceleration information acquisition part detecting or estimating acceleration information of the vehicle and a coolant flowrate regulation part regulating flowrate of the coolant supplied into the cooling pipe. The ejection aperture of the cooling pipe is formed to enable adjustment of ejection direction of the coolant ejected from the ejection aperture, depending on the flowrate of the coolant.

4 Claims, 8 Drawing Sheets

(56) References Cited

U.S. PATENT DOCUMENTS

| | | | | |
|---|---|---|---|---|
| 2016/0344247 A1* | 11/2016 | Jeong | ................ | H02K 9/19 |
| 2017/0067554 A1* | 3/2017 | Suenaga | ............ | F16H 57/0457 |
| 2017/0114886 A1* | 4/2017 | Matsushita | ......... | F16H 57/0443 |
| 2019/0113135 A1* | 4/2019 | Miyamoto | ............. | F25B 45/00 |
| 2019/0165654 A1 | 5/2019 | Inano et al. | | |
| 2019/0299769 A1* | 10/2019 | Li | ............ | H02K 5/20 |
| 2021/0328480 A1* | 10/2021 | Kosaka | ................ | H02K 1/148 |

FOREIGN PATENT DOCUMENTS

| | | | | | |
|---|---|---|---|---|---|
| JP | 2019-97331 | A | | 6/2019 | |
| JP | 2019161993 | A | * | 9/2019 | |
| JP | 2021118605 | A | * | 8/2021 | |
| WO | WO-2018016267 | A1 | * | 1/2018 | ............ B60K 11/02 |
| WO | WO-2020105467 | A1 | * | 5/2020 | ............ H02K 1/148 |

\* cited by examiner

ELECTRIC MOTOR COOLING APPARATUS

This application claims priority from Japanese Patent Application No. 2022-046094 filed on Mar. 22, 2022, the disclosure of which is herein incorporated by reference in its entirety.

FIELD OF THE INVENTION

The present invention relates to a cooling apparatus for an electric motor mounted as a driving force source on a vehicle.

BACKGROUND OF THE INVENTION

Various modes have been proposed as a cooling apparatus for an electric motor mounted as a driving force source on a vehicle. For example, JP2007-209160A describes an electric motor cooling apparatus in which a cooling pipe is arranged vertically above the electric motor, with coolant being ejected toward a stator coil of the electric motor from ejection apertures formed on the cooling pipe.

SUMMARY OF THE INVENTION

When the front/rear acceleration, left/right acceleration, or up/down acceleration varies during vehicle running, the ejection direction of coolant ejected from the cooling pipe changes, so that coolant ejected from the ejection apertures may not be poured onto the stator coil at a proper site.

The present invention was conceived against the background of the above circumstances and an object thereof is to provide an electric motor cooling apparatus capable of pouring coolant ejected from above the electric motor onto the electric motor stator coil at a proper site, irrespective of the change in the vehicle behavior during vehicle running.

The object indicated above is achieved according to the following aspects of the present invention.

According to a first aspect of the invention, there is provided (a) an electric motor cooling apparatus applied to an electric motor mounted as a driving force source on a vehicle, the electric motor having a stator core and a stator coil wound around the stator core, the electric motor cooling apparatus ejecting coolant toward the stator coil, the electric motor cooling apparatus comprises (b) a cooling pipe disposed above the electric motor in direction of a vertical line in on-vehicle state, the cooling pipe having an ejection aperture from which the coolant is ejected (c) an acceleration information acquisition part detecting or estimating acceleration information of the vehicle; and (d) a coolant flowrate regulation part regulating flowrate of the coolant supplied into the cooling pipe, based on the acceleration information, (e) the ejection aperture of the cooling pipe being formed to enable adjustment of ejection direction of the coolant ejected from the ejection aperture, depending on the flowrate of the coolant.

According to a second aspect of the invention, in the electric motor cooling apparatus of the first aspect of the invention, the ejection aperture is formed such that orientation of the ejection aperture is tilted with respect to the vertical line in the on-vehicle state.

According to a third aspect of the invention, in the electric motor cooling apparatus of the first aspect of the invention, the cooling pipe is configured to be supplied with the coolant discharged from an electric oil pump.

According to a fourth aspect of the invention, in the electric motor cooling apparatus of the first aspect of the invention, the electric motor is an in-wheel motor disposed in a wheel of the vehicle.

ADVANTAGEOUS EFFECT OF THE INVENITON

In this electric motor cooling apparatus, according to the first aspect of the invention, since the ejection apertures formed on the cooling pipe are configured to be able to adjust the direction of ejection of coolant depending on the flowrate of the coolant, with the flowrate of coolant supplied into the cooling pipe being changed based on the acceleration information of the vehicle, the direction of ejection of coolant can be kept in a proper state at all times irrespective of the change in the vehicle behavior, thus enabling coolant to be poured over the optimum range for cooling on the stator coil.

According to the second aspect of the invention, since the ejection apertures are formed such that the orientation of the ejection apertures is tilted with respect to the vertical line in the on-vehicle state, the direction of ejection of coolant can be adjusted appropriately by regulating the flowrate of coolant supplied into the cooling pipe.

According to the third aspect of the invention, since the cooling pipe is configured to be supplied with coolant discharged from the electric oil pumps, the discharge quantity of coolant supplied into the cooling pipe can be regulated by regulating the discharge quantity discharged from each of the electric oil pumps.

According to the fourth aspect of the invention, since the electric motor is the in-wheel motor disposed in each of the wheels of the vehicle, the direction of ejection of ejected from each cooling pipe can be adjusted properly depending on the behavior of each of the wheels by regulating the oil quantity of the cooling pipe for each of the electric motors disposed in the wheels.

DETAILED DESCRIPTION OF PREFERRED EMBODIMENTS

Embodiments of the present invention will hereinafter be described in detail with reference to the drawings. In the following embodiment, the figures are simplified or transformed appropriately, and the dimension ratios, shapes, etc., of parts are not necessarily drawn correctly.

Embodiments

Figure 1:
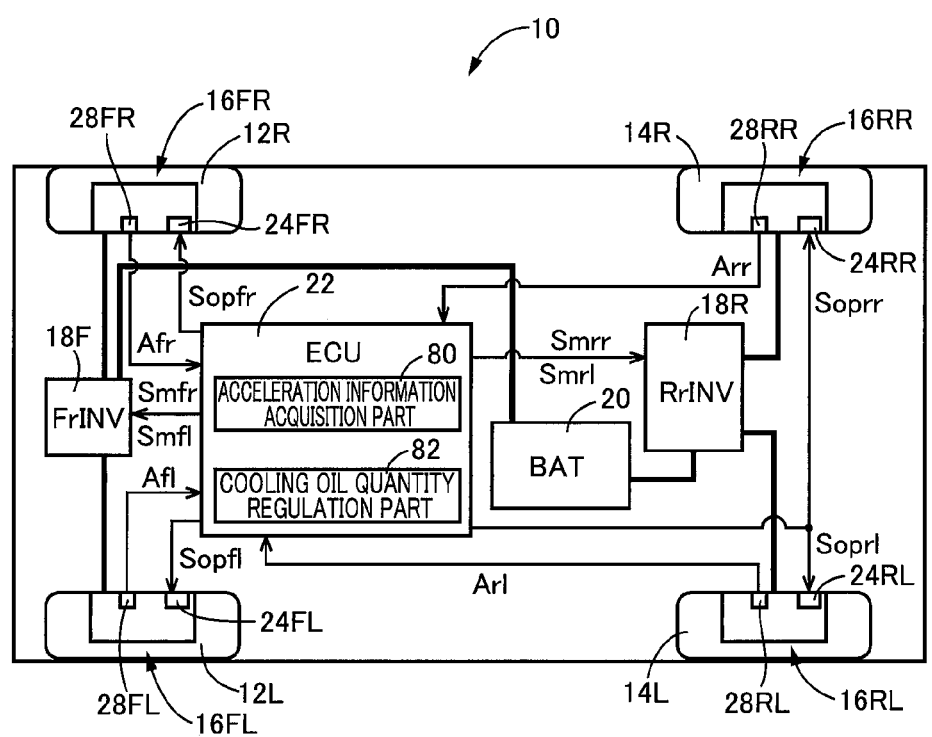
FIG. 1 is an overall view showing the outline of a vehicle that is an embodiment of the present invention.

FIG. 1 is an overall view showing the outline of a vehicle 10 that is an embodiment of the present invention. The vehicle 10 is a four-wheel drive electric vehicle having front wheels 12L and 12R and rear wheels 14L and 14R that are driven by driving in-wheel motor drive devices 16FL, 16FR, 16RL, and 16RR built in as driving force sources in the front wheels 12L and 12R and the rear wheels 14L and 14R, respectively. The in-wheel motor drive devices 16FL, 16FR, 16RL, and 16RR (hereinafter, motor drive devices 16) will be described later.

The motor drive devices 16 are connected to a battery 20 via a front inverter 18F (FrINV) or a rear inverter 18R (RrINV), to generate power for running by electricity supplied from the battery 20 via the front inverter 18F or the rear inverter 18R.

The front inverter 18F and the rear inverter 18R control the operating state of an electric motor MG described later disposed in each of the motor drive devices 16, based on control command signals $S_{mfl}$, $S_{mfr}$, $S_{mrl}$, and $S_{mrr}$ from an electronic control unit 22.

Depending on the running state of the vehicle 10, the electronic control unit 22 controls the driving state of the electric motor MG disposed in each of the motor drive devices 16 and controls the driving state of each of electric oil pumps 24FL, 24FR, 24RL, and 24RR (hereinafter, electric oil pumps 24) each disposed in a corresponding one of the motor drive devices 16.

The electronic control unit 22 is fed with pieces of acceleration information $A_{fl}$, $A_{fr}$, $A_{rl}$, $A_{rr}$, etc. detected by e.g. acceleration sensors 28FL, 28FR, 28RL, and 28RR disposed in the wheels (front wheels 12L and 12R and rear wheels 14L and 14R), respectively. The pieces of acceleration information $A_{fl}$, $A_{fr}$, $A_{rl}$, and $A_{rr}$ each contain front/rear acceleration $G_{fr}$, left/right acceleration $G_{lr}$, and up/down acceleration $G_{ud}$ of a corresponding one of the wheels.

For example, the electronic control unit 22 calculates a required output of the electric motor MG disposed in each of the motor drive devices 16, based on various pieces of information detected by various sensors, and issues control command signals $S_{mfl}$, $S_{mfr}$, $S_{mrl}$, and $S_{mrr}$ to the front inverter 18F and the rear inverter 18R so that the required output calculated is output from the electric motor MG.

Figure 2:
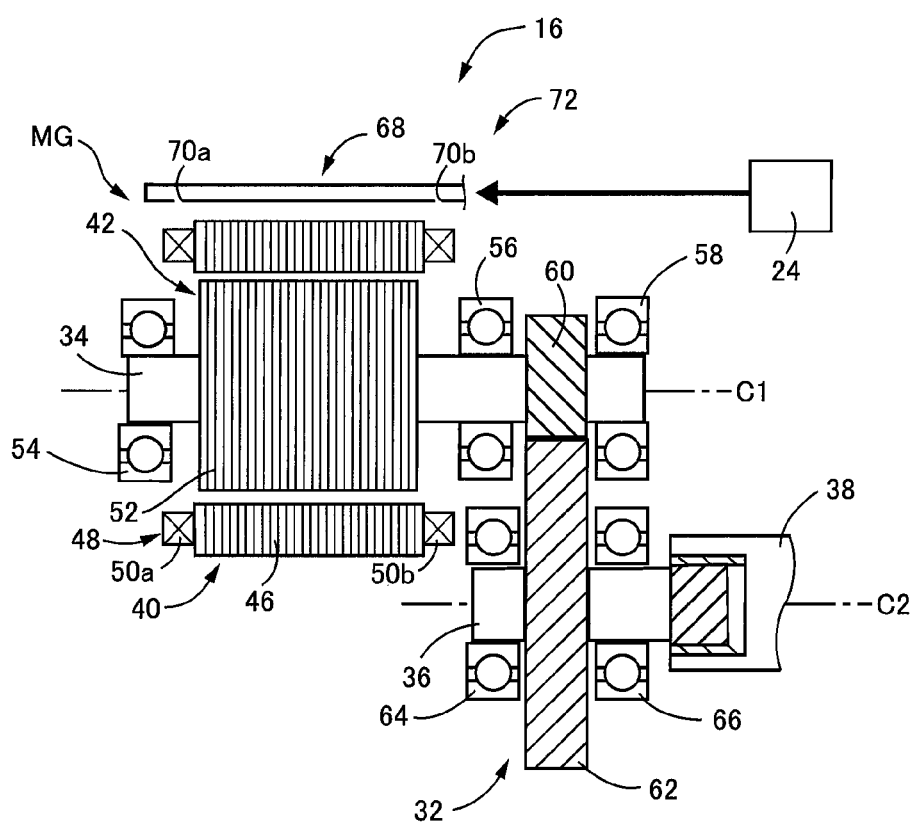
FIG. 2 is a sectional view explaining a structure of a motor drive device of FIG. 1.

FIG. 2 is a sectional view explaining a structure of each of the motor drive devices 16 mounted as driving force sources for running on the vehicle 10. The motor drive device 16 includes the electric motor MG and a gear reduction mechanism 32 within a casing not shown. Driving force output from a rotor shaft 34 of the electric motor MG is transmitted via the gear reduction mechanism 32 to a wheel shaft 36, and further transmitted via spline mating of the wheel shaft 36 and a wheel hub 38 to a corresponding one of the wheels (not shown in FIG. 2) fastened to the wheel hub 38. The electric motor MG functions as a so-called in-wheel motor that is disposed in each of the wheels to drive the each of the wheels.

The electric motor MG and the gear reduction mechanism 32 are housed in the casing. In this embodiment, a rotation axis C1 as a center of rotation of the electric motor MG is oriented parallel to the width direction of the vehicle 10. That is, the electric motor MG is arranged transversely with respect to the travelling direction of the vehicle 10.

The electric motor MG is arranged around the rotation axis C1. The electric motor MG includes a stator 40 and a rotor 42. The stator 40 includes a stator core 46 formed in a cylindrical shape from a plurality of laminated electromagnetic steel sheets, and a stator coil 48 wound around the stator core 46.

The stator core 46 is formed in a cylindrical shape and is fixed unrotatably to the casing with bolts or the like. The stator core 46 has on its inner peripheral surface a plurality of slots that are gaps extending in the direction of the rotation axis C1, with the stator coil 48 being wound around the stator core 46 through the slots. By winding the stator coil 48 around the stator core 46, a pair of coil ends 50a and 50b are formed that protrudes from the stator core 46 in the direction of the rotation axis C1.

The rotor 42 is arranged on the inner peripheral side of the stator 40. The rotor 42 includes the rotor shaft 34 supported rotatably around the rotation axis C1 and a rotor core 52 fixed to an outer peripheral surface of the rotor shaft 34. The rotor shaft 34 is supported rotatably around the rotation axis C1 via bearings 54, 56, and 58. The rotor core 52 is formed in a cylindrical shape from a plurality of laminated electromagnetic steel sheets. By fixing an inner peripheral surface of the rotor core 52 to the outer peripheral surface of the rotor shaft 34, the rotor core 52 and the rotor shaft 34 rotate integrally around the rotation axis C1. A drive pinion 60 in the form of a helical gear is fixed to the rotor shaft 34 on the wheel hub 38 side in the direction of the rotation axis C1.

The gear reduction mechanism 32 includes the drive pinion 60 and a driven gear 62 composed of a helical gear meshing with the drive pinion 60. Both ends on the rotation axis C1 of the drive pinion 60 are supported rotatably around the rotation axis C1 by the two bearings 56 and 58 supporting the rotor shaft 34. The wheel shaft 36 is supported rotatably around a rotation axis C2 parallel to the rotation axis C1 by bearings 64 and 66.

A cooling pipe 68 extending parallel to the rotation axis C1 is disposed above the electric motor MG in the direction of a vertical line when mounted on the vehicle. The on-vehicle state is based on the state where the vehicle 10 lies on a horizontal plane.

The cooling pipe 68 is arranged parallel to the horizontal plane in the on-vehicle state. The cooling pipe 68 has ejection apertures 70a and 70b through which cooling oil supplied as coolant into the cooling pipe 68 is ejected. Cooling oil ejected from the ejection holes 70a and 70b is set to head for the coil ends 50a and 50 of the electric motor MG from above the electric motor MG. The cooling pipe 68 is configured to be supplied with cooling oil discharged from each electric oil pump 24 built in each of the motor drive devices 16. Including the cooling pipe 68 and the electric oil pumps 24, a cooling apparatus 72 is configured that ejects cooling oil to the coil ends 50a and 50b of the stator coil 48 making up the electric motor MG.

Figure 3:
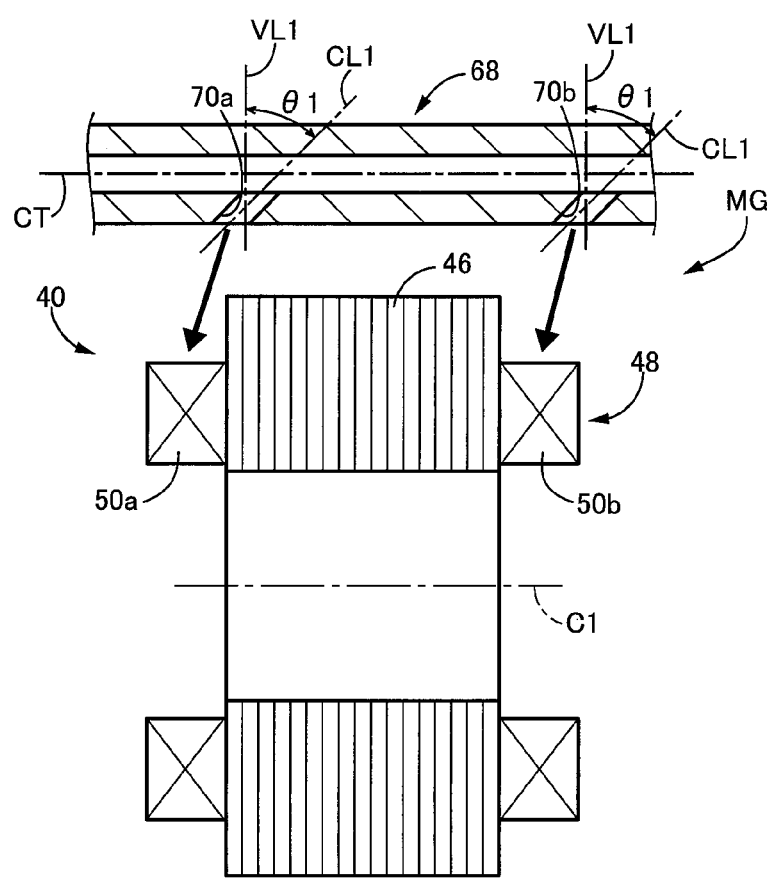
FIG. 3 is a view showing the direction of ejection of cooling oil ejected from ejection apertures of a cooling pipe of FIG. 2.

FIG. 3 is a view explaining the direction of ejection of cooling oil ejected from the ejection apertures 70a and 70b of the cooling pipe 68 of FIG. 2. In FIG. 3, the electric motor MG and the cooling pipe 68 are shown in a simplified manner with dimensions differing from the actual ones. FIG. 3 shows an arrangement relationship in the on-vehicle state where the vehicle lies on the horizontal plane, with the vertical direction of the paper corresponding to the direction of a vertical line, the transverse direction of the paper corresponding to the vehicle width direction. As shown in FIG. 3, the cooling pipe 68 parallel to the rotation axis C1 is arranged above the electric motor MG in the direction of the vertical line. The cooling pipe 68 is parallel to the horizontal plane in the on-vehicle state.

The cooling pipe 68 is formed with ejection apertures 70a and 70b for ejecting cooling oil toward the coil ends 50a and 50b. The orientation (direction) of the ejection apertures 70a and 70b is tilted with respect to the vertical line toward the vehicle width direction (right-hand side of the paper in FIG. 3) in the on-vehicle state. Specifically, the ejection apertures 70a and 70b are formed such that a rectilinear line CL1 along the orientation (direction) of the ejection apertures 70a and 70b tilts toward the vehicle width direction by a predetermined angle θ1 with respect to a vertical line VL1. The rectilinear line CL1 is equivalent to a straight line passing through the center of each of the ejection apertures 70a and 70b.

By forming the orientation of the ejection apertures 70a and 70b to tilt with respect to the vertical line as described above, cooling oil ejected from the ejection apertures 70a and 70b is allowed to head for the direction tilted with respect to the direction of the vertical line VL1. FIG. 3 shows the state where the left/right acceleration $G_{lr}$ of the vehicle 10 is zero. At this time, by setting an oil quantity Q of cooling oil (i.e. flowrate of cooling oil) supplied into the cooling pipe 68 to a preset standard oil quantity $Q_{st}$, cooling oil ejected from the ejection apertures 70a and 70b can be poured over an optimum range for cooling on the coil ends 50a and 50b. In other words, the standard oil quantity $Q_{st}$ for the oil quantity Q of cooling oil is found in advance experimentally or by design as a value with which cooling oil ejected from the ejection apertures 70a and 70b can be poured over the optimum range for cooling on the coil ends 50a and 50b when the left/right acceleration $G_{lr}$ of the vehicle 10 is zero.

When the left/right acceleration $G_{lr}$ occurs during turning for example in the state shown in FIG. 3 where the left/right acceleration $G_{lr}$ is zero, the direction of ejection of cooling oil ejected from the ejection apertures 70a and 70b changes, so that the pouring position of cooling oil may deviate from the optimum range for cooling on the coil ends 50a and 50b. To deal with this, the electronic control unit 22 is configured such that the oil quantity Q of cooling oil suppled into the cooling pipe 68 is regulated based on acceleration information detected by the acceleration sensors 28FL, 28FR, 28RL, and 28RR (hereinafter, acceleration sensors 28) attached to the front wheels 12L and 12R (hereinafter, front wheels 12) and the rear wheels 14L and 14R (hereinafter, rear wheels 14), respectively.

Figure 4:
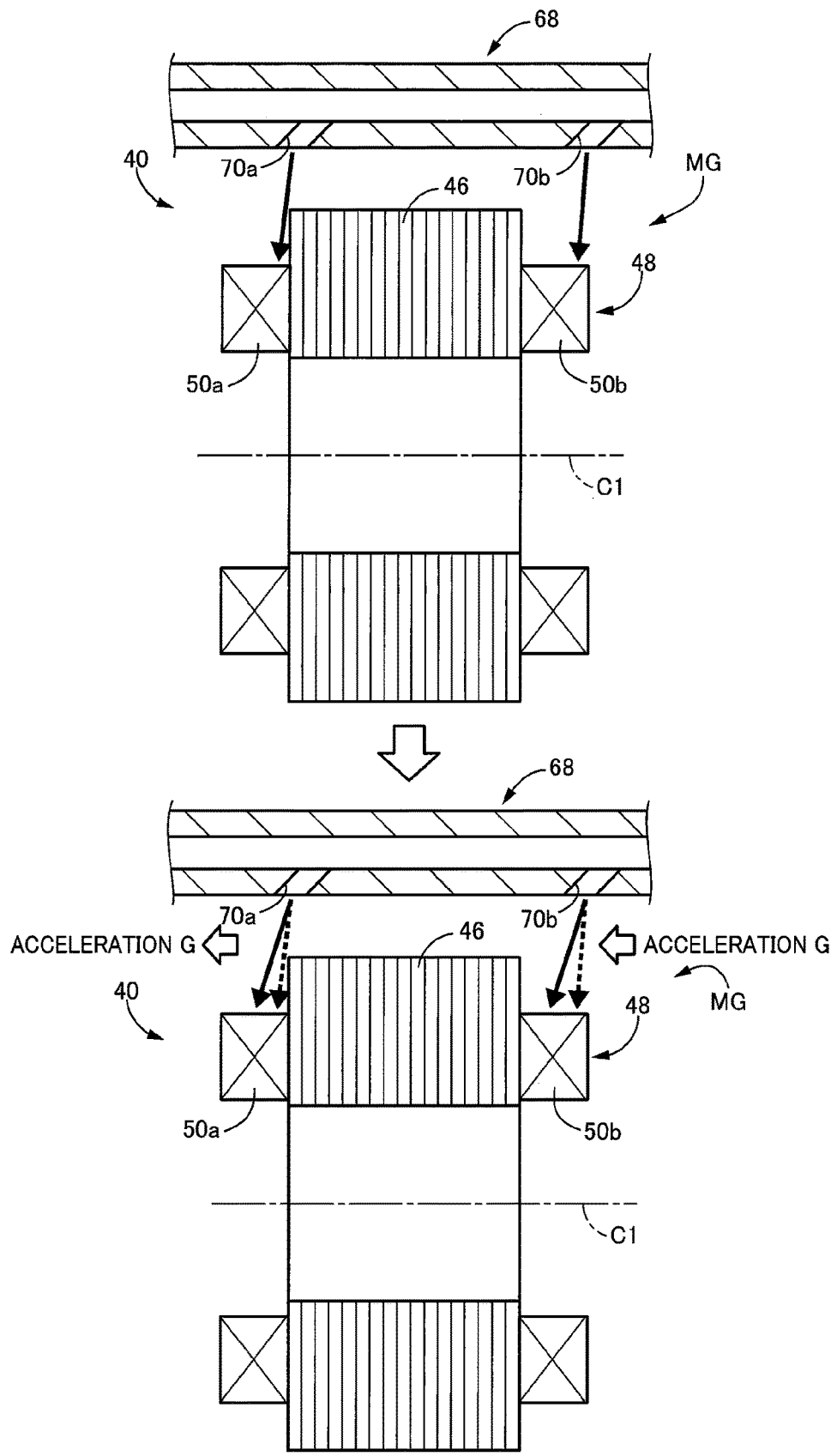
FIG. 4 is a view showing the case where the oil quantity of cooling oil supplied into the cooling pipe is small as compared with FIG. 3.

FIG. 4 shows the case where the oil quantity Q of cooling oil supplied into the cooling pipe 68 is small as compared with the state shown in FIG. 3. The upper part of FIG. 4 shows the state where the left/right acceleration $G_{lr}$ of the vehicle 10 is zero, while the lower part of FIG. 4 shows the case where the left/right acceleration $G_{lr}$, to the left in the vehicle width direction of the vehicle 10 has occurred.

As shown in the upper part of FIG. 4, in the case that the oil quantity Q of cooling oil supplied into the cooling pipe 68 is small (small oil quantity), the velocity of cooling oil ejected from the ejection apertures 70a and 70b becomes lower, so that cooling oil is poured onto the coil ends 50a and 50b at positions shifted to the right (right-hand side of the paper) in the vehicle width direction with respect to their respective centers in the direction of the rotation axis C1, as indicated by arrows. In the case that the left/right acceleration $G_{lr}$, to the left in the vehicle width direction occurs from this state, a force toward the left in the vehicle width direction acts on cooling oil. At this time, as shown in the lower part of FIG. 4, since the force to the left in the vehicle width direction acts on cooling oil ejected, the direction of ejection of cooling oil changes from the state indicated by dotted arrows to the state indicated by solid arrows. That is, as shown in the lower part of FIG. 4, the direction of ejection of cooling oil shifts to the left in the vehicle width direction. As a result, similar to the case shown in FIG. 3 where the left/right acceleration $G_{lr}$ is zero, cooling oil can be poured onto the coil ends 50a and 50b at their respective positions of the center in the direction of the rotation axis C1.

Figure 5:
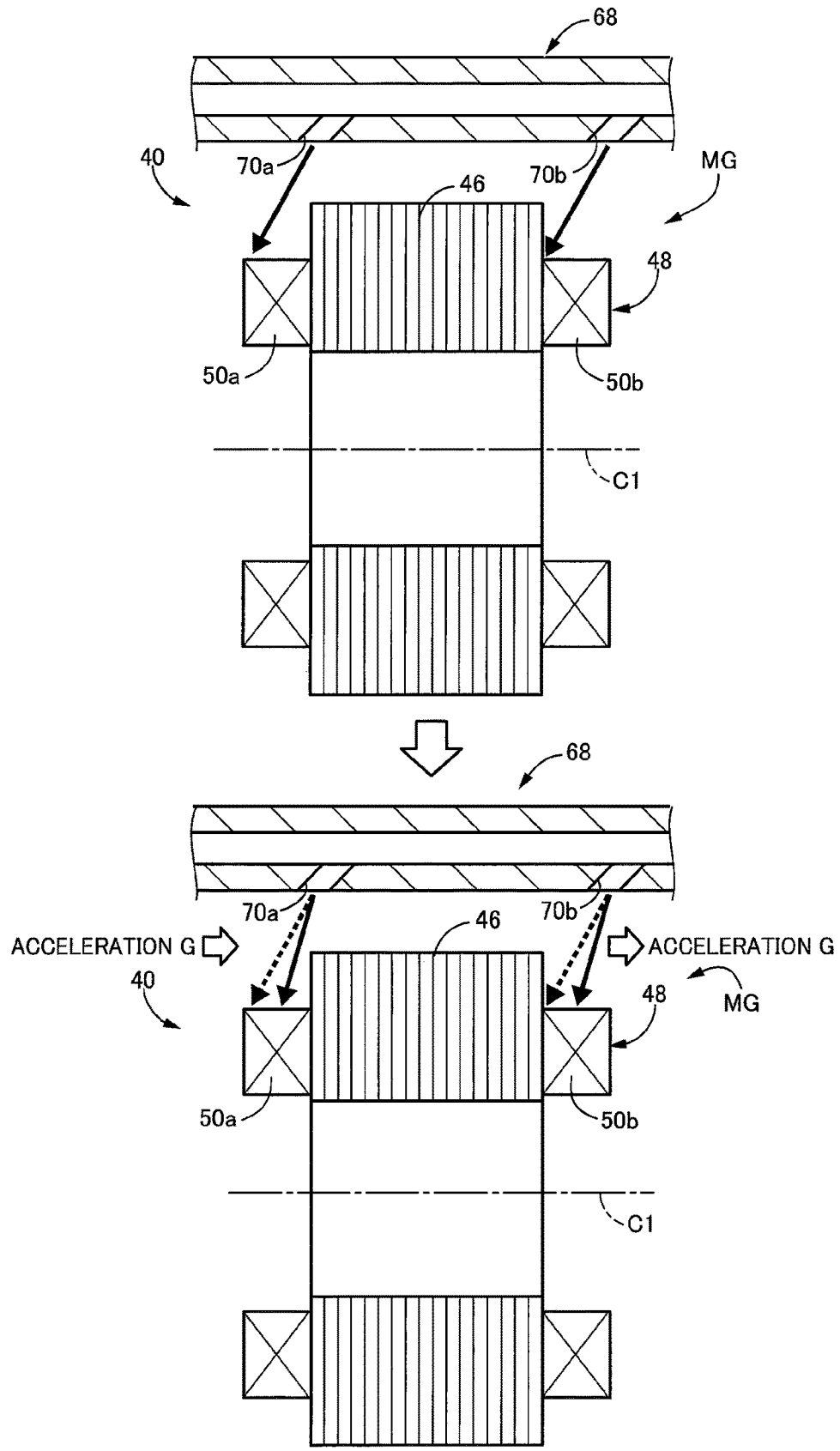
FIG. 5 is a view showing the case where the oil quantity of cooling oil supplied into the cooling pipe is large as compared with FIG. 3.

FIG. 5 shows the case where the oil quantity of cooling oil supplied into the cooling pipe is large (large oil quantity) as compared with the state shown in FIG. 3. The upper part of FIG. 5 shows the state where the left/right acceleration $G_{lr}$ of the vehicle 10 is zero, while the lower part of FIG. 4 shows the case where the left/right acceleration $G_{lr}$ to the right in the vehicle width direction of the vehicle 10 has occurred.

As shown in the upper part of FIG. 5, in the case that the oil quantity Q of cooling oil supplied into the cooling pipe 68 is large (large oil quantity), the velocity of cooling oil ejected from the ejection apertures 70a and 70b becomes higher, so that cooling oil is poured onto the coil ends 50a and 50b at positions shifted to the left (left-hand side of the paper) in the vehicle width direction with respect to their respective centers in the direction of the rotation axis C1, as indicated by arrows. In the case that the left/right acceleration $G_{lr}$ to the right in the vehicle width direction occurs from this state, a force toward the right in the vehicle width direction acts on cooling oil. At this time, as shown in the lower part of FIG. 5, since the force to the right in the vehicle width direction acts on cooling oil ejected, the direction of ejection of cooling oil changes from the state indicated by dotted arrows to the state indicated by solid arrows. That is, as shown in the lower part of FIG. 5, the direction of ejection of cooling oil shifts to the right in the vehicle width direction. As a result, similar to the case shown in FIG. 3 where the left/right acceleration $G_{lr}$ is zero, cooling oil can be poured onto the coil ends 50a and 50b at their respective positions of the center, i.e., at their respective optimum positions for cooling, in the direction of the rotation axis C1.

Based on the above, in the case that the left/right acceleration $G_{lr}$ of the vehicle 10 is zero, the electronic control unit 22 sets the oil quantity Q of cooling oil to the preset standard oil quantity $Q_{st}$, allowing the direction of ejection of cooling oil to be in the state shown in FIG. 3. In the case that the left/right acceleration Glr of the vehicle 10 acts toward the left in the vehicle width direction, the electronic control unit 22 sets the oil quantity Q of cooling oil to be less than the standard oil quantity Qst, so that the direction of ejection of cooling oil is as indicated by soild arrows in the lower part of FIG. 4. In the case that the left/right acceleration Glr of the vehicle 10 acts toward the right in the vehicle width direction, the electronic control unit 22 sets the oil quantity Q of cooling oil to be more than the standard oil quantity Qst, so that the direction ejection of cooling oil is as indicated by solid arrows in the lower part of FIG. 5. In this manner, the ejection apertures 70a and 70b are configured to be able to adjust the direction of ejection of cooling oil ejected from the ejection apertures 70a and 70b in the vehicle width direction depending on the oil quantity Q of cooling oil, whereby the electronic control unit 22 enables cooling oil to be poured over the optimum ranges on the coil ends 50a and 50b irrespective of the change in the left/right acceleration $G_{lr}$, by regulating the oil quantity Q of cooling oil supplied into the cooling pipe 68 depending on the left/right acceleration $G_{lr}$ of the vehicle 10.

Figure 6:
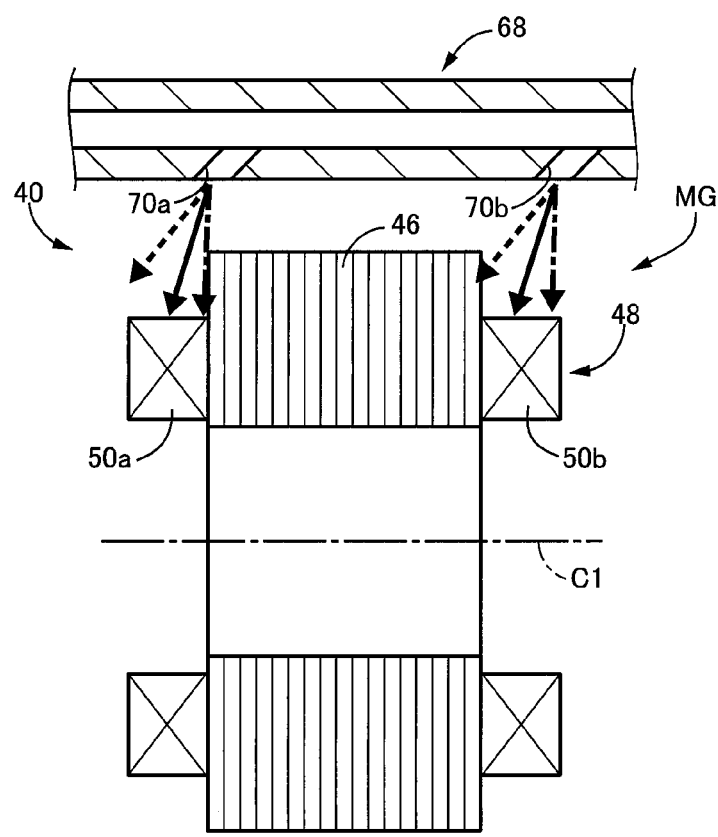
FIG. 6 is another view explaining the direction of ejection of cooling oil ejected from the ejection apertures of the cooling pipe.

Although FIGS. 3 to 5 show the modes covering the change in the left/right acceleration $G_{lr}$ of the vehicle 10, the present invention is applicable also to the front/rear acceleration $G_{fr}$ and the up/down acceleration $G_{ud}$. Similar to FIG. 3, FIG. 6 is a view explaining the direction of ejection of cooling oil ejected from the ejection apertures 70a and 70b of the cooling pipe 68. Solid arrows of FIG. 6 indicate the direction of ejection of cooling oil when the up/down acceleration $G_{ud}$ is zero with the oil quantity Q of cooling oil being the standard oil quantity $Q_{st}$. Dotted arrows indicate the direction of ejection of cooling oil in the case that the vehicle 10 is subjected to a vertically upward up/down acceleration $G_{ud}$ with the oil quantity Q of cooling oil being the standard oil quantity $Q_{st}$. Chain-dotted arrows indicate the direction of ejection of cooling oil in the case that the vehicle 10 is subjected to a vertically downward up/down acceleration $G_{ud}$ with the oil quantity Q being the standard oil quantity $Q_{st}$.

In the case that the vertically upward up/down acceleration $G_{ud}$ acts on the vehicle 10, as indicated by dotted arrows, the direction of ejection of cooling oil is upward and cooling oil cannot be poured over the optimum ranges for cooling on the coil ends 50a and 50b. To deal with this, the electronic control unit 22 reduces the oil quantity Q of cooling oil supplied into the cooling pipe 68. As a result, the velocity of cooling oil ejected from the ejection apertures 70a and 70b lowers the direction of ejection of cooling oil becomes the direction indicated by the solid arrows, so that cooling oil to be poured over the optimum range for cooling on the coil ends 50a and 50b.

In the case that the vertically downward up/down acceleration $G_{ud}$ acts on the vehicle 10, as indicated by chain-dotted arrows, the direction of ejection of cooling oil is downward and cooling oil cannot be poured over the optimum ranges for cooling on the coil ends 50a and 50b. To deal with this, the electronic control unit 22 increases the discharge quantity of cooling oil supplied into the cooling pipe 68. As a result, the velocity of cooling oil ejected from the ejection apertures 70a and 70b goes up, the direction of ejection of cooling oil becomes the direction indicated by the solid arrows, so that cooling oil to be poured over the optimum range for cooling on the coil ends 50a and 50b.

In this manner, by regulating the oil quantity Q of cooling oil supplied into the cooling pipe 68 depending on the up/down acceleration $G_{ud}$ of the vehicle 10, the electronic control unit 22 enables cooling oil to be poured over the optimum range for cooling on the coil ends 50a and 50b irrespective of the change in the up/down acceleration $G_{ud}$.

Figure 7:
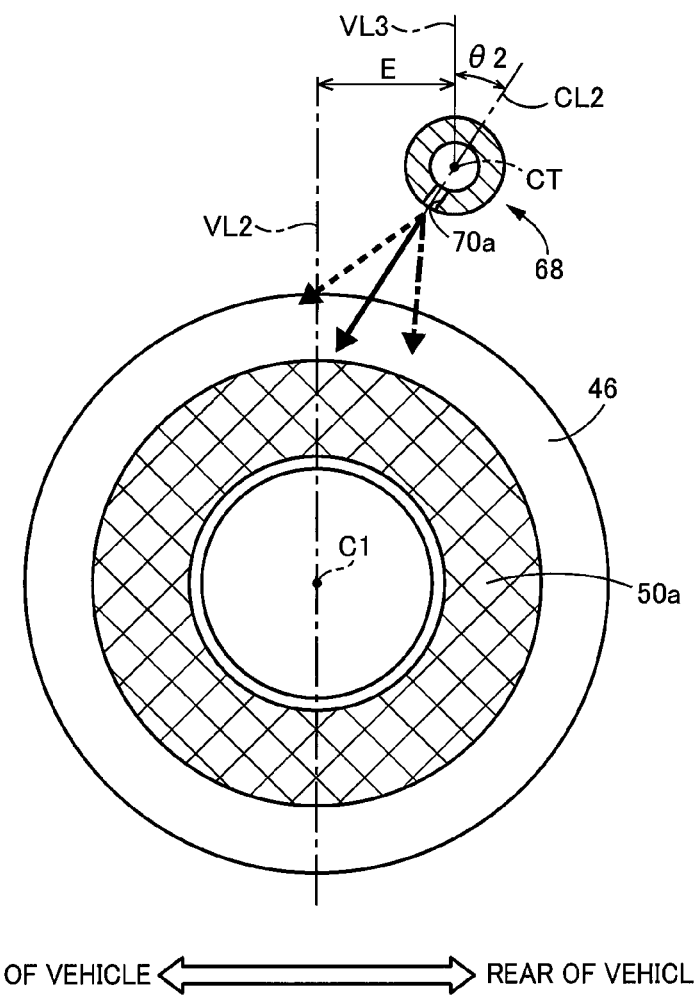
FIG. 7 is still another view explaining the direction of ejection of cooling oil ejected from the ejection apertures of the cooling pipe.

Similarly, the present invention is applicable also to the front/rear acceleration $G_{fr}$. FIG. 7 is a view of the electric motor MG and the cooling pipe 68, seen from the rotation axis C1. In FIG. 7, the upper side of the paper corresponds to vertically above, while the left side of the paper corresponds to the front of the vehicle. Although in FIG. 7 the coil end 50a side is shown, the coil end 50b side is also configured in the same manner.

As shown in FIG. 7, the cooling pipe 68 is arranged at a position apart a distance E in the horizontal line direction from a vertical line VL2 passing through the rotation axis C1 of the electric motor MG. In the ejection apertures 70a and 70b, the orientation (direction) of the ejection apertures 70a and 70b is tilted relative to the vertical line. Specifically, the ejection apertures 70a and 70b are configured such that a rectilinear line CL2 along the orientation (direction) of the ejection apertures 70a and 70b is tilted by a predetermined angle θ2 in the front-rear direction of the vehicle with respect to a vertical line VL3 extending through a center CT of the cooling pipe 68. The rectilinear line CL2 is equivalent to a straight line extending through the center of each of the ejection apertures 70a and 70b. In this manner, by tilting the rectilinear line CL2 along the orientation of the ejection apertures 70a and 70b relative to the vertical line VL3, the direction of ejection of cooling oil can be adjusted in the front-rear direction of the vehicle depending on the oil quantity Q of cooling oil supplied into the cooling pipe 68.

In FIG. 7, a solid arrow indicates the direction of ejection of cooling oil in the state where the front/rear acceleration $G_{fr}$ is zero. By ejecting cooling oil in the direction indicated by the solid arrow, cooling oil can be poured over the optimum range for cooling on the coil ends 50a and 50b. The oil quantity Q of cooling oil at this time corresponds to the standard oil quantity $Q_{st}$.

A dotted arrow of FIG. 7 indicates the direction of ejection of cooling oil in the case that the oil quantity Q supplied into the cooling pipe 68 is increased beyond the standard oil quantity $Q_{st}$. Since the velocity of cooling oil ejected from the ejection apertures 70a and 70b becomes higher at this time, the direction of ejection of cooling oil is upward as indicated by the dotted arrow. A chain-dotted arrow of FIG. 7 indicates the direction of ejection of cooling oil in the case that the oil quantity Q supplied into the cooling pipe 68 is decreased below the standard oil quantity $Q_{st}$. Since the velocity of cooling oil ejected from the ejection apertures 70a and 70b becomes lower at this time, the direction of ejection of cooling oil is downward as indicated by the chain-dotted arrow.

Considering the above, the electronic control unit 22 increases the oil quantity Q of cooling oil above the standard oil quantity $Q_{st}$ in the case that the front/rear acceleration $G_{fr}$ occurs toward the rear of the vehicle. In consequence, a force acting toward the rear of the vehicle is combined with cooling oil ejected, resulting in the direction of ejection of cooling oil indicated by the solid arrow. The electronic control unit 22 decreases the oil quantity Q of cooling oil below the standard oil quantity $Q_{st}$ in the case that the front/rear acceleration $G_{fr}$ occurs toward the front of the vehicle. In consequence, a force acting toward the front of the vehicle is combined with cooling oil ejected, resulting in the direction of ejection of cooling oil indicated by the solid arrow.

In this manner, by regulating the oil quantity Q of cooling oil supplied into the cooling pipe 68 depending on the front/rear acceleration $G_{fr}$ of the vehicle 10, the electronic control unit 22 enables cooling oil to be poured over the optimum range for cooling on the coil ends 50a and 50b irrespective of the change in the up/down acceleration $G_{ud}$.

Referring back to FIG. 1, the electronic control unit 22 functionally includes an acceleration information acquisition part 80 and a cooling oil quantity regulation part 82, that run to pour lubricant oil over the optimum range for cooling on the coil ends 50a and 50b of the electric motor MG irrespective of the change in the vehicle behavior (i.e., front/rear acceleration $G_{fr}$, left/right acceleration $G_{lr}$, and up/down acceleration $G_{ud}$ of the vehicle 10). The cooling oil quantity regulation part 82 corresponds to a coolant flowrate regulation part of the present invention.

The acceleration information acquisition part 80 acquires acceleration information (front/rear acceleration $G_{fr}$, left/right acceleration $G_{lr}$, and up/down acceleration $G_{ud}$) for each of the wheels (front wheels 12 and rear wheels 14) from the acceleration sensors 28 attached to the front wheels 12 and the rear wheels 14.

When acceleration information of each of the wheels is acquired, the cooling oil quantity regulation part 82 determines whether the direction of ejection of cooling oil ejected from the ejection apertures 70a and 70b deviates from the optimum range, based on acceleration information acquired. The cooling oil quantity regulation part 82 stores, for example, a tolerance threshold value of each of the front/rear acceleration $G_{fr}$, left/right acceleration $G_{lr}$, and up/down acceleration $G_{ud}$ of the vehicle 10, to determine as deviating from the optimum range in the case that any of the accelerations deviates from its tolerance threshold value. The tolerance threshold value of each of the accelerations is found experimentally or by design in advance and is set to a threshold value allowing cooling oil ejected from the ejection apertures 70a and 70b to be poured over the range regarded as optimum for cooling on the coil ends 50a and 50b.

When the direction of ejection of cooling oil is determined as deviating from the optimum range, the cooling oil quantity regulation part 82 regulates the oil quantity Q of cooling oil supplied into the cooling pipe 68, based on the acquired acceleration information. Since cooling oil supplied into the cooling pipe 68 is cooling oil discharged from the electric oil pumps 24, the cooling oil quantity regulation part 82 actually regulates a discharge quantity $Q_{op}$ of each of the electric oil pumps 24, to thereby regulate the oil quantity Q of cooling oil supplied into the cooling pipe 68.

The cooling oil quantity regulation part 82 stores a relationship map that determines a required discharge quantity $Q_{opr}$ of each of the electric oil pumps 24 by using as parameters the front/rear acceleration $G_{fr}$, left/right acceleration $G_{lr}$, and up/down acceleration $G_{ud}$ of the vehicle 10, and applies acceleration information acquired for each of the wheels to the relationship map, to thereby determine the required discharge quantity $Q_{opr}$ of the electric oil pump 24 for each of the wheels. The discharge quantity $Q_{op}$ of the electric oil pumps 24 is substantially the same as the oil quantity Q of cooling oil supplied into the cooling pipe 68.

The relationship map is found experimentally or by design in advance for storage, in which the required discharge quantity $Q_{opr}$ of each of the electric oil pumps 24 is set so as to allow cooling oil ejected from the ejection apertures 70a and 70b to be poured on the coil ends 50a and 50b at proper positions for cooling, irrespective of the change in the vehicle behavior, i.e., the change in each of the accelerations. In the case that for example each of the accelerations is zero, the relationship map is set so that the oil quantity Q of cooling oil supplied into the cooling pipe 68 to be the standard oil quantity $Q_{st}$. In the case that for example the left/right acceleration $G_{lr}$ acts toward the left in the vehicle width direction as shown in the lower part of FIG. 4, the relationship map is set so that the oil quantity Q of cooling oil to be less than the standard oil quantity $Q_{st}$. In the case that for example the left/right acceleration $G_{lr}$ acts toward the right in the vehicle width direction as shown in the lower part of FIG. 5, the relationship map is set so that the oil quantity Q of cooling oil to be more than the standard oil quantity $Q_{st}$.

The cooling oil quantity regulation part 82 determines the required discharge quantity $Q_{opr}$ of each of the electric oil pumps 24 based on the relationship map, to control the discharge quantity $Q_{op}$ discharged from each of the electric oil pumps 24 to be the required discharge quantity $Q_{opr}$ found. By virtue of the above control, the oil quantity Q of cooling oil supplied into the cooling pipe 68 is regulated even though a change in the vehicle behavior (i.e., a change in each of the accelerations) occurs, whereby the direction of ejection of cooling oil ejected from the ejection apertures 70a and 70b is kept in the proper state. As a result, cooling oil can be poured over the optimum range for cooling on the coil ends 50a and 50b irrespective of the change in the vehicle behavior. Since the required discharge quantity $Q_{opr}$ is figured out for each of the electric oil pumps 24 disposed in the wheels, the oil quantity Q of cooling oil supplied into the cooling pipe 68 becomes the optimum value in accordance with the state of each of the wheels, achieving more enhanced cooling efficiency at the coil ends 50a and 50b of each of the electric motors MG.

Figure 8:
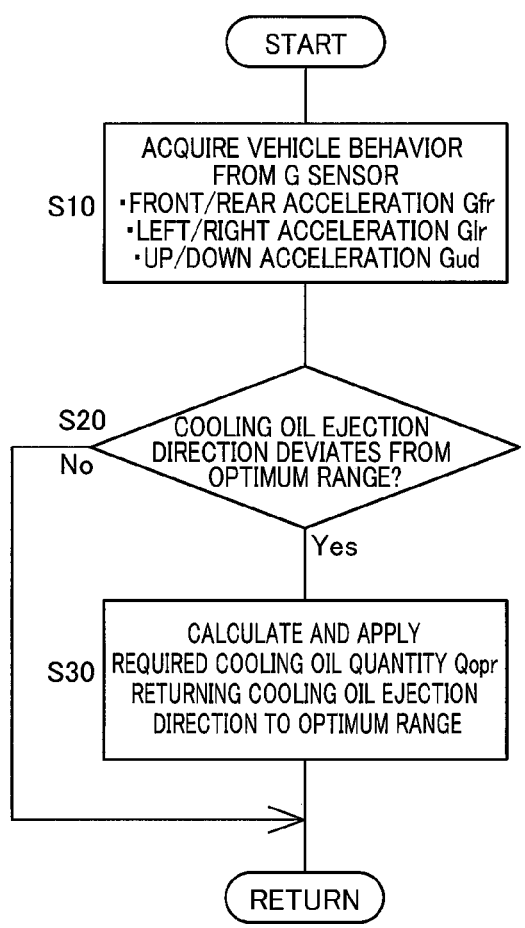
FIG. 8 is a flowchart explaining a principal part of control operation of an electronic control unit.

FIG. 8 is a flowchart explaining a principal part of control operation of the electronic control unit 22, the flowchart explaining the control operation enabling cooling oil to be poured over the optimum range for cooling on the coil ends 50a and 50b of the electric motor MG, irrespective of the change in the vehicle behavior, i.e., the change in each of the acceleration. This flowchart is executed repeatedly during the vehicle running.

First, at step S10 (hereinafter, the term "step" will be omitted) corresponding to a control function of the acceleration information acquisition part 80, the front/rear acceleration $G_{fr}$, the left/right acceleration $G_{lr}$, and the up/down acceleration $G_{ud}$ are acquired as the vehicle behavior from the acceleration sensors 28 disposed on the wheels. Then, at S20 corresponding to a control function of the cooling oil quantity regulation part 82, it is determined whether the direction of ejection of cooling oil ejected from the ejection apertures 70a and 70b deviates from an optimum range for cooling, based on whether the acquired accelerations G (up/down acceleration $G_{ud}$, left/right acceleration $G_{lr}$, and front/rear acceleration $G_{fr}$) are within their respective ranges specified. If the determination at S20 is negative, the required discharge quantity $Q_{opr}$ of the electric oil pump 24 is set to a previously specified standard quantity (i.e., standard oil quantity $Q_{st}$). On the other hand, the determination at S20 is affirmative, at S30 corresponding to the control function of the cooling oil quantity regulation part 82, the acquired acceleration information is applied to the previously specified relationship map to find the cooling oil required discharge quantity $Q_{opr}$ rendering proper the direction of ejection of cooling oil ejected from the ejection apertures 70a and 70b, whereby each of the electric oil pumps 24 is controlled so as to achieve the required discharge quantity $Q_{opr}$ found.

As described above, according to this embodiment, since the ejection apertures 70a and 70b formed on the cooling pipe 68 are configured to be able to adjust the direction of ejection of cooling oil depending on the oil quantity Q of the cooling oil, with the oil quantity Q of cooling oil supplied into the cooling pipe 68 being changed based on the acceleration information (front/rear acceleration $G_{fr}$, left/right acceleration $G_{lr}$, and up/down acceleration $G_{ud}$) of the vehicle 10, the direction of ejection of cooling oil can be kept in a proper state at all times, through the proper regulation of the oil quantity Q of cooling oil depending on the acceleration information, irrespective of the change in the vehicle behavior, thus enabling cooling oil to be poured over the optimum range for cooling on the coil ends 50a and 50b.

According to this embodiment, since the ejection apertures 70a and 70b are formed such that the orientation of the ejection apertures is tilted with respect to the vertical line in the on-vehicle state, the direction of ejection of cooling oil can be adjusted appropriately by regulating the oil quantity Q of cooling oil supplied into the cooling pipe 68. Since the cooling pipe 68 is configured to be supplied with cooling oil discharged from the electric oil pumps 24, the oil quantity Q of cooling oil supplied into the cooling pipe 68 can be regulated by regulating the discharge quantity $Q_{op}$ discharged from each of the electric oil pumps 24. Since the electric motor MG is the in-wheel motor disposed in each of the wheels of the vehicle 10, the direction of ejection of cooling oil ejected from each cooling pipe 68 can be adjusted properly depending on the behavior of each of the wheels by regulating the oil quantity Q of the cooling pipe 68 for each of the electric motors MG disposed in the wheels.

Although the embodiment of the present invention has hereinbefore been described in detail with reference to the drawings, the present invention is applicable to other modes.

Although in the above embodiment the electric motor MG is the in-wheel motor disposed in each of the front wheels 12 and the rear wheels 14, the present invention is not necessarily limited to the in-wheel motor. For example, the present invention is applicable also to any vehicle having the electric motor MG disposed on the vehicle body. That is, the present invention is applicable also to any vehicle of a type in which power of the electric motor MG disposed in the vehicle body is transmitted via the transmission, etc. to at least one of the front wheels and the rear wheels. The present invention is not necessarily limited to the electric vehicle and is applicable to any vehicle of a hybrid type having the engine and the electric motor MG as its driving force source.

Although in the above embodiment the vehicle 10 is the four-wheel drive vehicle having the motor drive device 16 disposed in each of the front wheels 12 and the rear wheels 14, the present invention is not necessarily limited thereto. For example, the vehicle can be any two-wheel drive vehicle of a front-wheel drive type having the motor drive device 16 disposed in only the front wheels 12 or any two-wheel drive vehicle of a rear-wheel drive type having the motor drive device 16 disposed in only the rear wheels 14.

Although in the above embodiment the required discharge quantity $Q_{opr}$ of the electric oil pump 24 is found from the relationship map specified in advance, the required discharge quantity $Q_{opr}$ may be found based on e.g. a previously specified relational expression with the accelerations as parameters.

Although in the above embodiment the acceleration sensor 28 is disposed in each of the wheels, the vehicle 10 may include a single acceleration sensor so that the oil quantity Q of cooling oil is regulated based on acceleration information detected by the single acceleration sensor. In relation to this, the electric oil pump 24 need not necessarily be disposed in each of the motor drive devices 16, and, for example, cooling oil may be supplied from a single electric oil pump disposed on the vehicle to each of the motor drive devices 16.

Although in the above embodiment the ejection apertures 70a and 70b are formed tilted in both the directions, i.e., in the vehicle front-rear direction and the vehicle width direction with respect to the vertical line, the ejection apertures 70a and 70b need not necessarily be tilted in both the directions and may be tilted in either the vehicle front-rear direction or the vehicle width direction.

Although in the above embodiment the acceleration information is acquired by the acceleration sensors 28, the acceleration information may be estimated based on other information, such as estimating the acceleration based on rotation speed information acquired from a rotation speed sensor for example.

Although in the above embodiment the electric motor MG is of a transversely-oriented type in which its rotation axis C1 is oriented parallel to the axle of the wheels, the electric motor MG may be of a longitudinally-oriented type in which the rotation axis C1 of the electric motor MG is oriented parallel to the traveling direction of the vehicle. In this case, the cooling pipe is also arranged such that its longitudinal direction is parallel to the traveling direction of the vehicle.

It is to be noted that the above is a mere embodiment and that the present invention can be carried out in modes variously altered or modified based on the knowledge of those skilled in the art.

EXPLANATIONS OF LETTERS OR NUMERALS

10: vehicle
24: electric oil pump
46: stator core
48: stator coil
68: cooling pipe
70a, 70b: ejection aperture
72: cooling apparatus
80: acceleration information acquisition part
82: cooling oil quantity regulation part (coolant flowrate regulation part)
MG: electric motor (in-wheel motor)

The invention claimed is:

1. An electric motor cooling apparatus applied to an electric motor mounted as a driving force source on a vehicle, the electric motor having a stator core and a stator coil wound around the stator core, the electric motor cooling apparatus ejecting coolant toward the stator coil, comprising:
   a cooling pipe disposed above the electric motor in direction of a vertical line in on-vehicle state, the cooling pipe having an ejection aperture from which the coolant is ejected;
   an acceleration information acquisition part detecting or estimating acceleration information of the vehicle; and
   a coolant flowrate regulation part regulating flowrate of the coolant supplied into the cooling pipe, based on the acceleration information,
   the ejection aperture of the cooling pipe being formed to enable adjustment of ejection direction of the coolant ejected from the ejection aperture, depending on the flowrate of the coolant, wherein
   the coolant flowrate regulation part increases the flowrate of the coolant when the acceleration information indicates an acceleration acting in one direction to be higher than the flowrate of the coolant when the acceleration information indicates no acceleration acting in the one direction, and
   the coolant flowrate regulation part decreases the flowrate of the coolant when the acceleration information indicates an acceleration acting in an opposite direction to the one direction to be lower than the flowrate of the coolant when the acceleration information indicates no acceleration acting in the one direction.

2. The electric motor cooling apparatus of claim 1, wherein
   the ejection aperture is formed such that orientation of the ejection aperture is tilted with respect to the vertical line in the on-vehicle state.

3. The electric motor cooling apparatus of claim 1, wherein
   the cooling pipe is configured to be supplied with the coolant discharged from an electric oil pump.

4. The electric motor cooling apparatus of claim 1, wherein the electric motor is an in-wheel motor disposed in a wheel of the vehicle.

* * * * *